United States Patent
Obayashi (10) Patent No.: US 11,373,313 B2
(45) Date of Patent: Jun. 28, 2022

(54) IMAGE PROCESSING APPARATUS AND IMAGE PROCESSING METHOD

(71) Applicant: CANON KABUSHIKI KAISHA, Tokyo (JP)

(72) Inventor: Masaaki Obayashi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 41 days.

(21) Appl. No.: 16/941,640

(22) Filed: Jul. 29, 2020

(65) Prior Publication Data
US 2021/0042933 A1    Feb. 11, 2021

(30) Foreign Application Priority Data
Aug. 8, 2019 (JP) .............................. JP2019-146827

(51) Int. Cl.
| | |
|---|---|
| *G06T 7/00* | (2017.01) |
| *G06T 7/11* | (2017.01) |
| *G06N 3/08* | (2006.01) |
| *G06V 10/25* | (2022.01) |
| *G06V 10/44* | (2022.01) |

(52) U.S. Cl.
CPC ................ *G06T 7/11* (2017.01); *G06N 3/08* (2013.01); *G06V 10/25* (2022.01); *G06V 10/44* (2022.01); *G06T 2207/20132* (2013.01)

(58) Field of Classification Search
CPC ............. G06T 7/11; G06T 2207/20132; G06T 2207/20081; G06T 2207/20084; G06T 7/73; G06K 9/3233; G06K 9/4604; G06N 3/08

See application file for complete search history.

(56) References Cited

U.S. PATENT DOCUMENTS

| | | |
|---|---|---|
| 10,290,135 B2 | 5/2019 | Mizoguchi et al. |
| 10,740,641 B2 | 8/2020 | Iguchi et al. |

(Continued)

FOREIGN PATENT DOCUMENTS

| | | | |
|---|---|---|---|
| JP | 2017134853 A | * | 8/2017 |
| JP | 6214073 B2 | | 10/2017 |

OTHER PUBLICATIONS

Miao, He et al., "Pedestrian Detection with Semantic Regions of Interest," Sensors, vol. 17, No. 11, Nov. 22, 2017, p. 2699, XP055759181, DOI: 10.3390/s17112699.

(Continued)

*Primary Examiner* — Ping Y Hsieh
*Assistant Examiner* — Xiao Liu
(74) *Attorney, Agent, or Firm* — Venable LLP (57) ABSTRACT

An image processing method executed by an image includes acquiring image data, acquiring region of interest data indicating a targeted region in recognition processing for an object included in the image data, acquiring information of a candidate region based on a degree of being similar to an object included in the image data, estimating an object region in the acquired image data based on the region of interest data and the information of a candidate, performing a preview display of a plurality of candidate images to be cropped on a display unit by using information of the estimate object region, and receiving a selection by a user from among the plurality of displayed candidate images. Cropping is performed on the image data that corresponds to the candidate image, for a received selection.

11 Claims, 7 Drawing Sheets

(56) References Cited

U.S. PATENT DOCUMENTS

2013/0101170 A1* 4/2013 Park .................... G06T 7/70
                                                    382/103
2018/0260793 A1* 9/2018 Li ..................... G06N 3/08
2019/0172224 A1* 6/2019 Vajda .................. G06T 7/77
2019/0236782 A1* 8/2019 Amit ................ A61B 10/0041
2019/0327367 A1   10/2019 Obayashi et al.

OTHER PUBLICATIONS

Partial European Search Report dated Dec. 22, 2020, issued in corresponding European Application No. 20187459.1.
Selvaraju et al., "Grad-CAM: Visual Explanations from Deep Networks via Gradient-based Localization," 2017.

\* cited by examiner

IMAGE PROCESSING APPARATUS AND IMAGE PROCESSING METHOD

CROSS-REFERENCE TO RELATED APPLICATIONS

This application claims the benefit of Japanese Patent Application No. 2017-134753, filed Mar. 16, 2017, which is hereby incorporated by reference herein in their entirety.

BACKGROUND OF THE INVENTION

Field of the Invention

The present invention relates to an image processing apparatus, and an image processing method, for executing image processing.

Description of the Related Art

Technologies related to image feature extraction by neural networks are known. For example, a technology in which, by a convolutional neural network (CNN), an intermediate image that contributes to the improvement of a recognition rate is extracted from a group of intermediate images in an intermediate layer, then a composite image is generated is known (Japanese Patent No. 6214073).

Japanese Patent No. 6214073 discloses that a neural network emphasizes a point of interest when recognizing an object. However, the accuracy of object location estimation is insufficient.

SUMMARY OF THE INVENTION

In the case of performing an object location estimation in an application that processes objects in image data, an improvement in accuracy of estimation is required. The present invention provides a technology for improving the accuracy of object location estimation.

The present invention in one aspect provides an image processing method executed by an image processing apparatus, the method comprising steps of acquiring image data, acquiring region of interest data for indicating a targeted region in recognition processing for an object included in the image data, acquiring candidate region information for an object extracted from the image data, and estimating an object region in the acquired image data based on the region of interest data and the candidate region information.

The present invention in one aspect provides an image processing apparatus comprising a first acquisition unit configured to acquire image data, a second acquisition unit configured to acquire region of interest data for indicating a targeted region in recognition processing for an object included in the image data, a third acquisition unit configured to acquire candidate region information for an object extracted from the image data, and an estimation unit configured to estimate an object region in the image data acquired by the first acquisition unit based on the region of interest data and the candidate region information.

By virtue of the present invention, the accuracy of object location estimation can be improved.

Further features of the present invention will become apparent from the following description of exemplary embodiments with reference to the attached drawings.

DESCRIPTION OF THE EMBODIMENTS

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

Figure 1A:
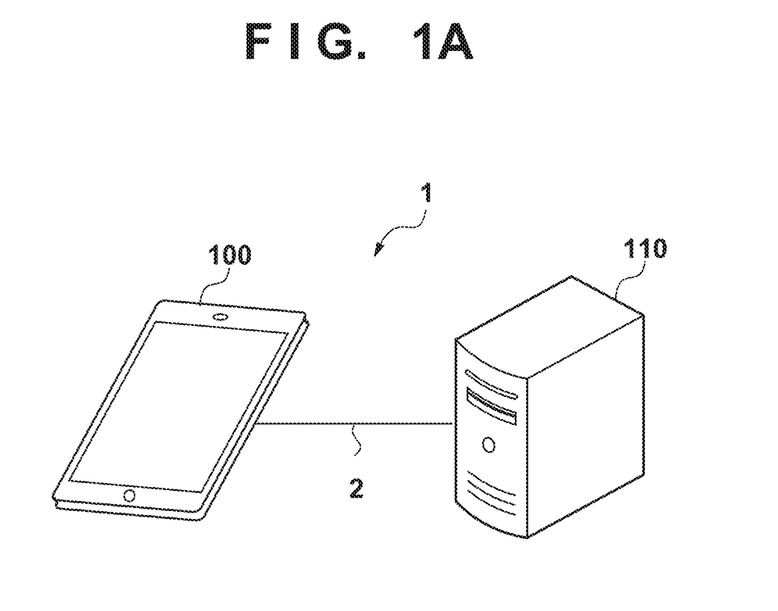
FIG. 1A to FIG. 1C are diagrams illustrating a configuration of an image processing system.

FIG. 1A is a diagram illustrating an overall configuration of an image processing system 1 in the present embodiment. As illustrated in FIG. 1A, the image processing system 1 comprises a user terminal 100 and a cloud server 110 serving as an image processing apparatus. The user terminal 100 and the cloud server 110 are configured to enable sending and receiving of data to and from one another via a network 2. The user terminal 100 is an information processing apparatus such as a tablet, a smartphone, or a PC. The network 2 is a network comprising a wired communication network, a wireless communication network, or both. Note that there may be a case when another information processing apparatus is connected between the user terminal 100 and the cloud server 110. In such a case, the user terminal 100 and the cloud server 110 are both able to communicate with the information processing apparatus via the network 2. Also, the cloud server 110 comprises of one or more servers (a server system). If the cloud server 110 comprises of multiple servers, a function of the cloud server 110 is executed by multiple servers in cooperation with each other. An image processing application, such as an album creation application, is installed on the user terminal 100. Note that, in the present embodiment, a cropping feature of the image processing application uses image data specified by a user to generate a cropped image candidate.

Figure 1B:
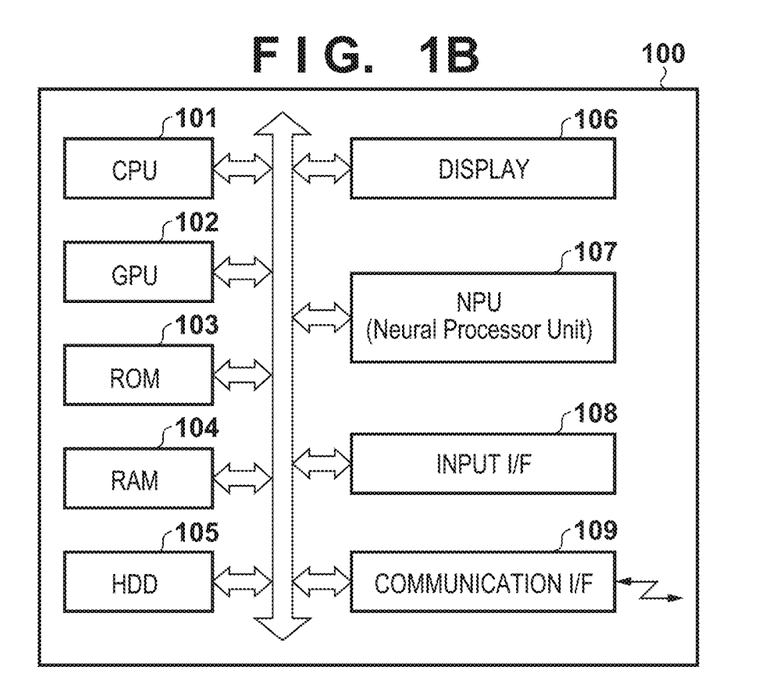

FIG. 1B is a block diagram illustrating a hardware configuration of the user terminal 100. A CPU 101 comprehensively controls an operation of the user terminal 100 by extracting a control program stored in a ROM 103 to a RAM 104, and reading the program out as necessary to thereby perform various kinds of control such as image processing control. A GPU (graphics processing unit) 102 is used as an accelerator for processes that require a high-load parallel computing such as machine learning, audio recognition, image recognition, and natural language processing. Also, the GPU 102 is able to control a display of a display 106 by performing calculation processing necessary when performing an image depiction.

The ROM 103 stores various kinds of programs such as a boot program of the user terminal 100. The ROM 103, for example, uses a flash storage. The RAM 104 is a main storage apparatus of the CPU 101 and, for example, is used as a temporary storage region for extracting various kinds of programs stored in a work area or the ROM 103. A hard disk drive (hereafter, HDD) 105 is a bulk storage unit for storing, for example, image processing applications such as an album creation application as well as image data. Image data is, for example, video data or photographic data captured using a camera function of the user terminal 100 or image data obtained from the network 2 or a storage medium such as a USB. Displaying by the display 106 is controlled by the CPU 101 and the GPU 102, and the display 106 displays a user interface screen for an image processing application, for example.

A neural network processing unit (NPU) 107 is a dedicated chip embedded with a neural network simulating a human cranial nervous system. By embedding the NPU 107 into the user terminal 100, the user terminal 100 (specifically, an edge side in relation to a server side) is enabled to execute image recognition, natural language processing, and such by deep learning, for example, that were to be performed on the cloud.

An input I/F (interface) 108 is an interface for connecting various kinds of input apparatuses (not illustrated) such as a keyboard, a mouse, and a touch display. The input I/F 108 receives a user operation from such input apparatuses, for example. Input data corresponding to the received user operation is used by an application realized by the CPU 101 such as in each module of an image processing application 200 later described in FIG. 2. A communication I/F 109 comprises a USB I/F and a network I/F, and is an interface for connecting with a USB and the network 2. The network I/F comprises a configuration supporting a medium of the network 2. The user terminal 100 connects with an external cloud server 110 via the communication I/F 109.

Figure 1C:
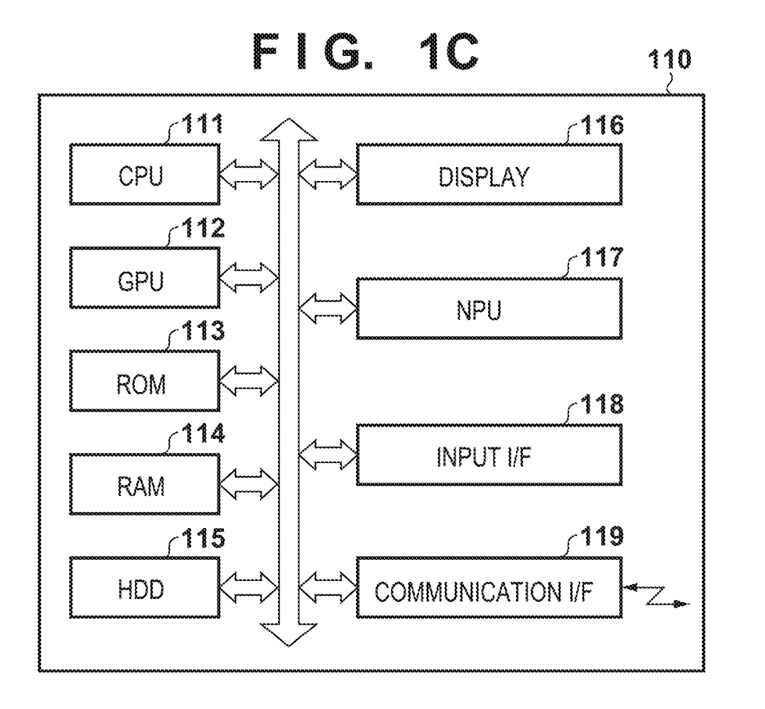

FIG. 1C is a block diagram illustrating a hardware configuration of the cloud server 110. As illustrated in FIG. 1C, the basic configuration of the cloud server 110 is the same as the user terminal 100. Thus, an explanation relating to those from the CPU 111 to the communication I/F 119 is the same as the explanation of those from the CPU 101 to the communication I/F 109 in FIG. 1B. However, a capability or a capacity can be different between the respective blocks of the cloud server 110 and the user terminal 100. Also, a block configuration of the user terminal 100 and a block configuration of the cloud server 110 may be different. For example, the server 110 may have a configuration without a display 116. Also, the user terminal 100 may have a configuration without the NPU 107 and a configuration may be taken such that the user terminal 100 obtains a processing result of an NPU 117 of the cloud server 110.

Figure 2:
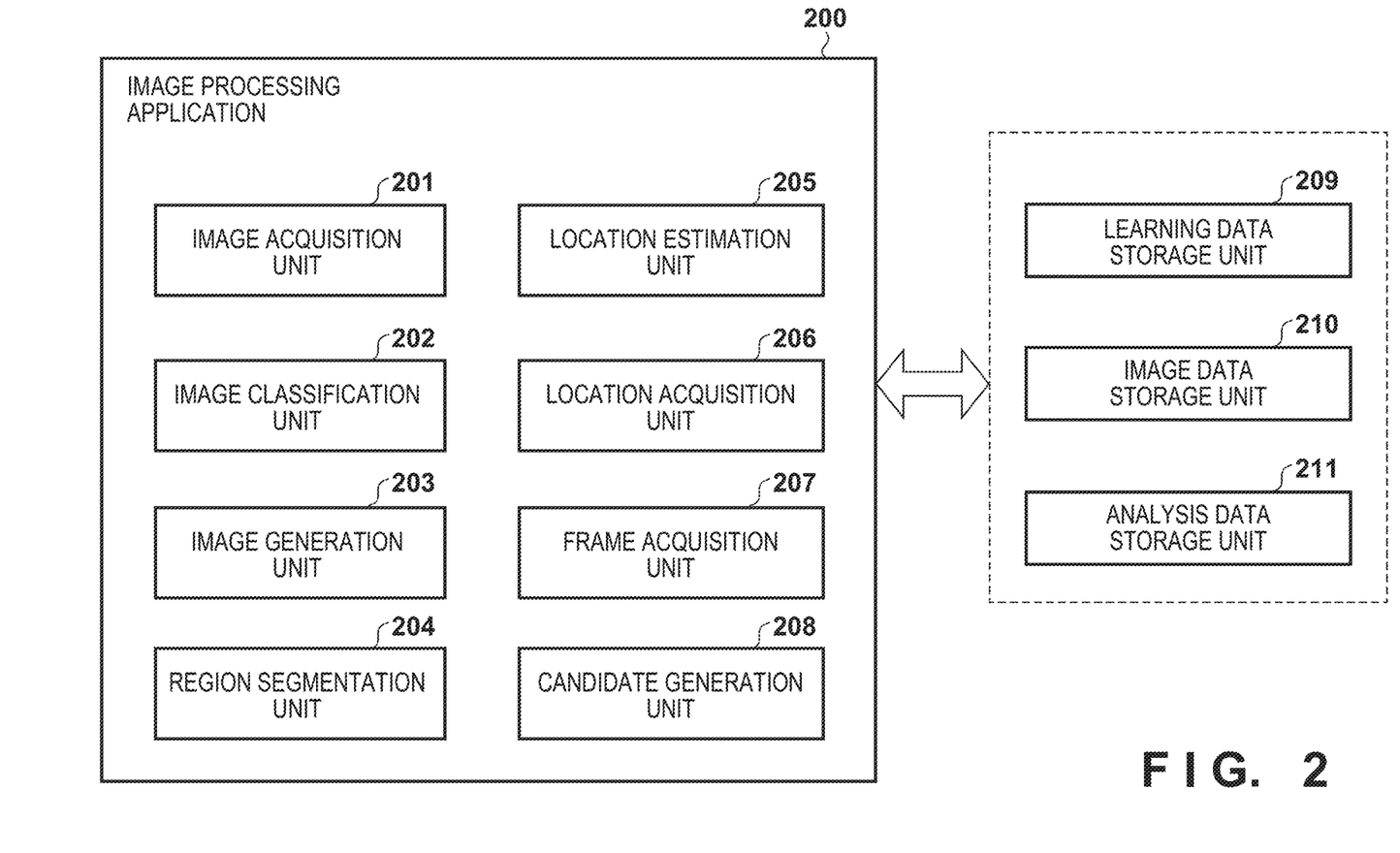
FIG. 2 is a diagram illustrating a block configuration of an image processing application.

FIG. 2, in the present embodiment, is a diagram illustrating a block configuration of the image processing application 200. Also, each block in the image processing application 200 is realized, for example, by the CPU 101 executing the image processing application 200 program stored in the HDD 105. In such a case, the HDD 105 functions as a learning data storage unit 209, an image data storage unit 210, and an analysis data storage unit 211. An image acquisition unit 201 obtains image data from the image data storage unit 210 specified by a user operation on an interface screen. Also, the image acquisition unit 201 is able to obtain information associated with image data, for example, an image size from Exif information.

An image classification unit 202 recognizes objects included in image data, then, classifies them under multiple classes. A classification of image data into multiple classes means, for example, a classification into categories, such as dogs and cats, which are what image data is classified into as a result of image recognition. In the present embodiment, a learned convolutional neural network (CNN) is used, as a learned model that is stored in the learning data storage unit 209, to classify image data inputted in the CNN into a predetermined number of classes. For example, image data is classified into one hundred classes or one thousand classes. Also, although a CNN is used in this example, the present embodiment is not limited to this. For example, algorithms such as a support-vector machine or a boosting may be used.

A learned model is generated on the cloud server 110. A learning unit (not illustrated in FIG. 2) on the cloud server 110 learns using an image data set comprising multiple image data. For example, each image data element includes any of various kinds of objects such as animals, plants, sea creatures, buildings, vehicles, and people and it is preferable to prepare about five thousand images per class.

The learning unit inputs these image data to the CNN and outputs the classification result, for example, of one hundred classes. The learning unit comprises an error detection unit and an update unit, and the error detection unit acquires a difference between output data outputted from an output layer in response to input data inputted to the input layer of the CNN and supervised data. The error detection unit uses a loss function to calculate a difference between the output data from the neural network and the supervised data. The update unit, based on a difference acquired by the error detection unit uses back propagation, for example, to update inter-node connection weighting coefficients of the CNN so as to lessen the difference. Back propagation is a method of adjusting inter-node connection weighting coefficients of the neural network to lessen the difference between the output data and the supervised data. In the present embodiment, the learning unit is configured on the cloud server 110 side and the CNN learning described above is performed on the cloud server 110. The user terminal 100 acquires a learned CNN (a learned model) on the cloud server 110 and uses the learned CNN to perform an object location estimation in image data. By such a configuration in the present embodiment, the configuration for an object location estimation in image data in the user terminal 100 can be facilitated. Also, learning is not limited to cases when it is provided in the cloud server 110 and may be executed by an external server 110.

An image generation unit 203 acquires an amount of features from the image data. The image generation unit 203 uses an intermediate image in an intermediate layer of a CNN used for image recognition to generate a heatmap image. The CNN acquires the amount of features from the intermediate layer which is compromised of a convolutional layer and a pooling layer. Then, the probability score of each class is outputted by the final layer. Also, as the output result, the class with the highest probability score is tagged. Therefore, for example, in the case when the probability of "dog" is the highest, the object discrimination result of the input image is outputted as "dog". The intermediate image in the intermediate layer of the CNN is an image that represents the amount of features that contribute to image recognition. The image generation unit 203 processes the intermediate image by changing the brightness, for example, and calculates the change in output of the loss function. The image generation unit 203 extracts, as an intermediate image in an intermediate layer of the CNN, an image for which the calculated output change is greater than or equal to a threshold value. Also, a heatmap image is data (region of interest data) that indicates a targeted region in class determination (object recognition process) executed by the CNN. For example, a feature region of interest in the CNN is visualized on a color map according to a Grad-CAM (Gradient-weighted Class Activation Mapping) technology.

In Grad-CAM, visualization corresponds to a gradient of the final layer of the CNN. For example, only one class, which is classified under "dog," out of one hundred classes is visualized corresponding to the gradient of the final layer of the CNN. That is, in such a case, the region determined as "dog" is acquired as a heatmap image corresponding to the size of the response value. Also, the response value is an index indicating a location of interest and the degree of interest in image recognition and corresponds to a change in output of the loss function described above. Grad-CAM is disclosed in Ramprasaath R. Selvaraju, Michael Cogswell, Abhishek Das, Ramakrishna Vedantam, Devi Parikh, Dhruv Batra, Grad-CAM: Visual Explanations from Deep Networks via Gradient-based Localization, 2017. Therefore, details will be omitted.

A region segmentation unit 204 executes region segmentation on image data. In the present embodiment, using a selective search, for example, similar regions are grouped in units of pixels on the image, and candidate object regions are extracted by determining the degree to which they are like an object. Additionally, methods used for region segmentation are not limited to a selective search, and other methods such as sliding window and GrabCut can also be used.

A location estimation unit 205 estimates the location of objects on image data based on a heatmap image generated by the image generation unit 203 and a candidate region extracted by the region segmentation unit 204. Details on an object location estimation are later described. Also, the location estimation unit 205 stores the coordinates (location coordinates) indicating the estimated location in the analysis data storage unit 211 in association with the image data.

A location acquisition unit 206 acquires the location coordinates stored in the analysis data storage unit 211. A frame acquisition unit 207 acquires information of cropping frames, which are later described. A candidate generation unit 208 generates cropped image candidates from the location coordinates acquired by the location acquisition unit 206 and the information of cropping frames acquired by the frame acquisition unit 207. Details on generating cropped image candidates are later described.

The image processing application 200, when installed on the user terminal 100, displays an activation icon on a top screen (a desktop) of an operating system (OS) that is running on the user terminal 100. When the user performs an operation, such as a double-click, on the activation icon on the desktop shown on the display 106, a program of the image processing application 200 stored on the HDD 105 is loaded into the ROM 103. When the program of the ROM 103 is read out to the RAM 104 and is executed by the CPU 101, the image processing application 200 starts up.

Figure 3A:
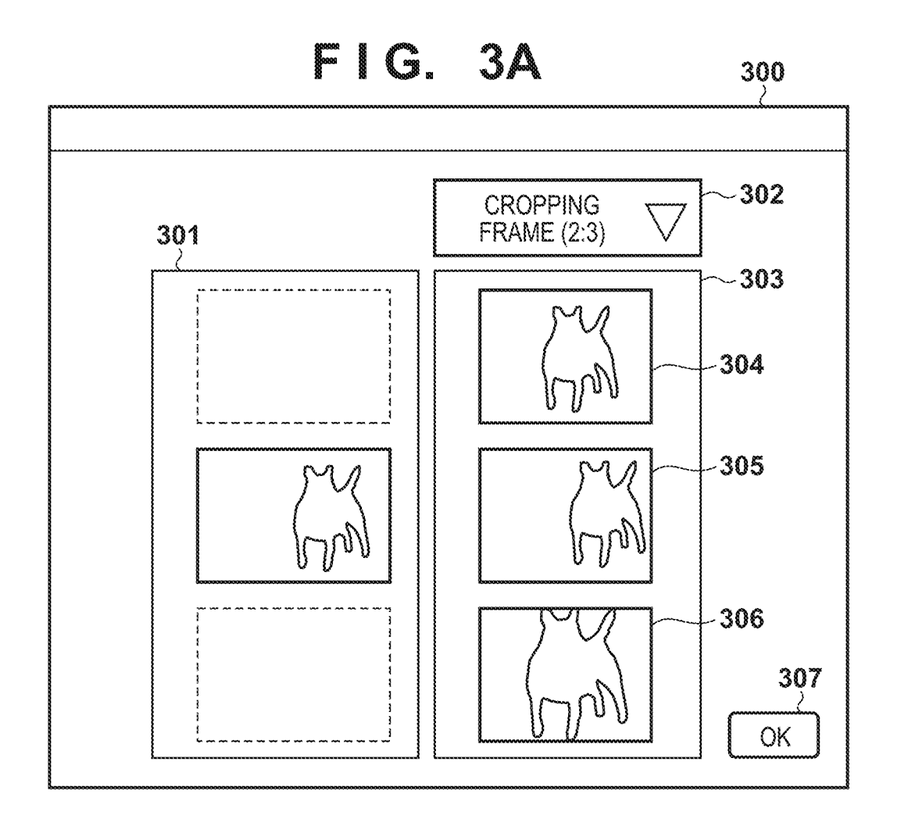
FIGS. 3A and 3B are diagrams illustrating a screen of an image processing application.
Figure 3B:
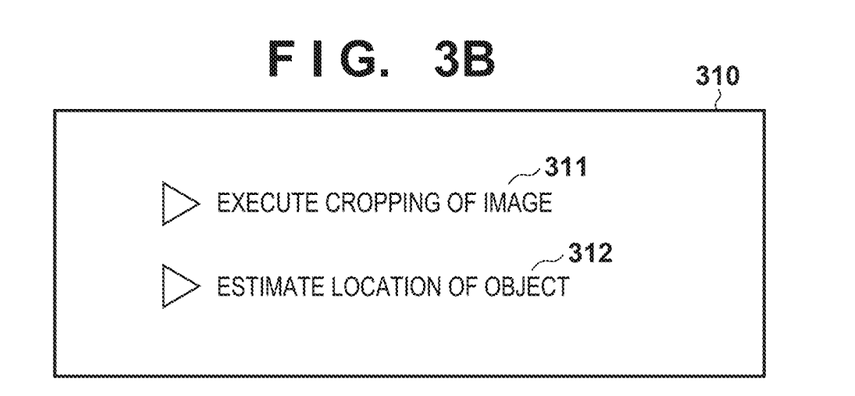

FIG. 3A is a view illustrating an example of a display screen 300 provided by the image processing application 200. The display screen 300 is displayed on the display 106 of the user terminal 100 after the image processing application 200 starts up as described above. The display screen 300 may be configured, for example, so that it is displayed as a main screen after the image processing application 200 starts up. Also, in the case that the image processing application 200 is an album creation application, the display screen 300 may be configured as an editing screen, which includes a layout image representing a layout result with multiple images arranged in a template. Also, in the case when the user specifies a particular image from an image specification area 301 on the display screen 300, a menu item 310 illustrated in FIG. 3B may be displayed. The menu item 310 includes an item 311, "execute cropping of image", and an item 312, "estimate location of object". If the item 311, "execute cropping of image" is selected, a cropping frame specification box 302 and a candidate area 303 are displayed. On the other hand, if the selection of an item 312, "estimate location of object," from the menu item 310 illustrated in FIG. 3B is received, an execution of processing later described in FIG. 4 starts.

The image specification area 301 is a region that displays a list of image data stored in the image data storage unit 210. In the case that the image processing application 200 is an album creation application, the image specification area 301 may, for example, be a region for a layout image within the editing screen. In the case when particular image data is selected on the image specification area 301 by a user operation, the image acquisition unit 201 acquires the image data corresponding to the selected image from the image data storage unit 210. The image specification area 301 may, for example, have a format in which it is displayed as a list of folders and file names.

In the cropping frame specification box 302, information regarding the cropping frame selected by a user operation from the drop-down list is displayed. Information regarding a cropping frame as a target of selection is, for example, an aspect ratio, and cropping frame information conforming with a predetermined aspect ratio, such as "2:3" or "4:3", can be selected. An area for cropped image candidates 303 is a region for displaying cropped candidate images for the image that the user selected from the image specification area 301. A preview display of cropped image candidates 304, 305, and 306 of the image that the user has selected and that have been cropped in the aspect ratio of the cropping frame that is selected from the cropping frame specification box 302 is displayed in the area for cropped image candidates 303. In FIG. 3, a middle image out of the three images in the image specification area 301 has been selected as a target of cropping, and in the area for cropped image candidates 303, three cropped image candidates for the case when the image is cropped at a 2:3 aspect ratio are displayed. The cropped image candidates are displayed according to cropping methods that the image processing application 200 is able to execute. Cropping methods are described later.

The area for cropped image candidates 303 is able to accept a selection of one of the cropped image candidates 304, 305, or 306 by a user operation such as a click. When an OK button 307 is pressed, the image data acquisition unit 201 executes cropping corresponding to the cropped image candidate for which the selection in the area for cropped image candidates 303 was received, and the image data resulting from executing that cropping is stored in the image data storage unit 210.

Figure 4:
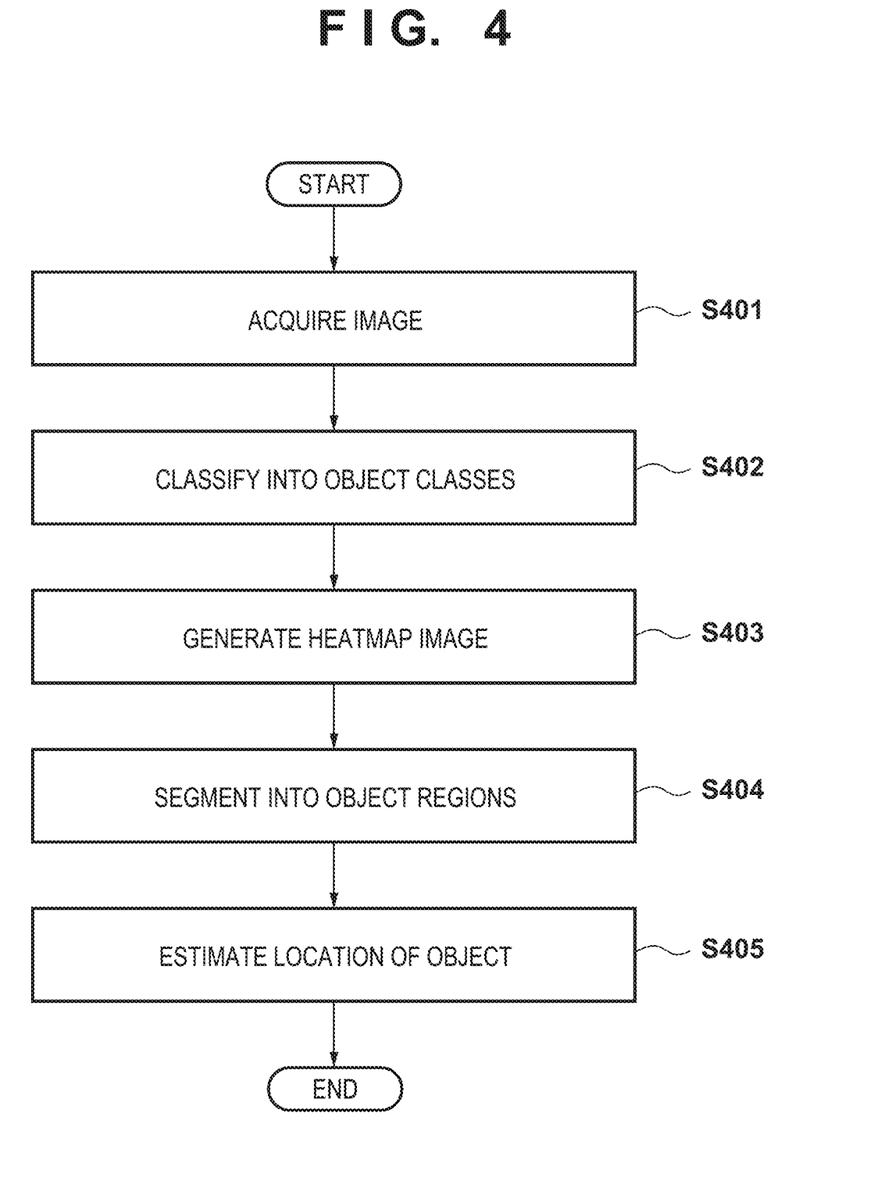
FIG. 4 is a flowchart illustrating a process for object location estimation.
Figure 5:
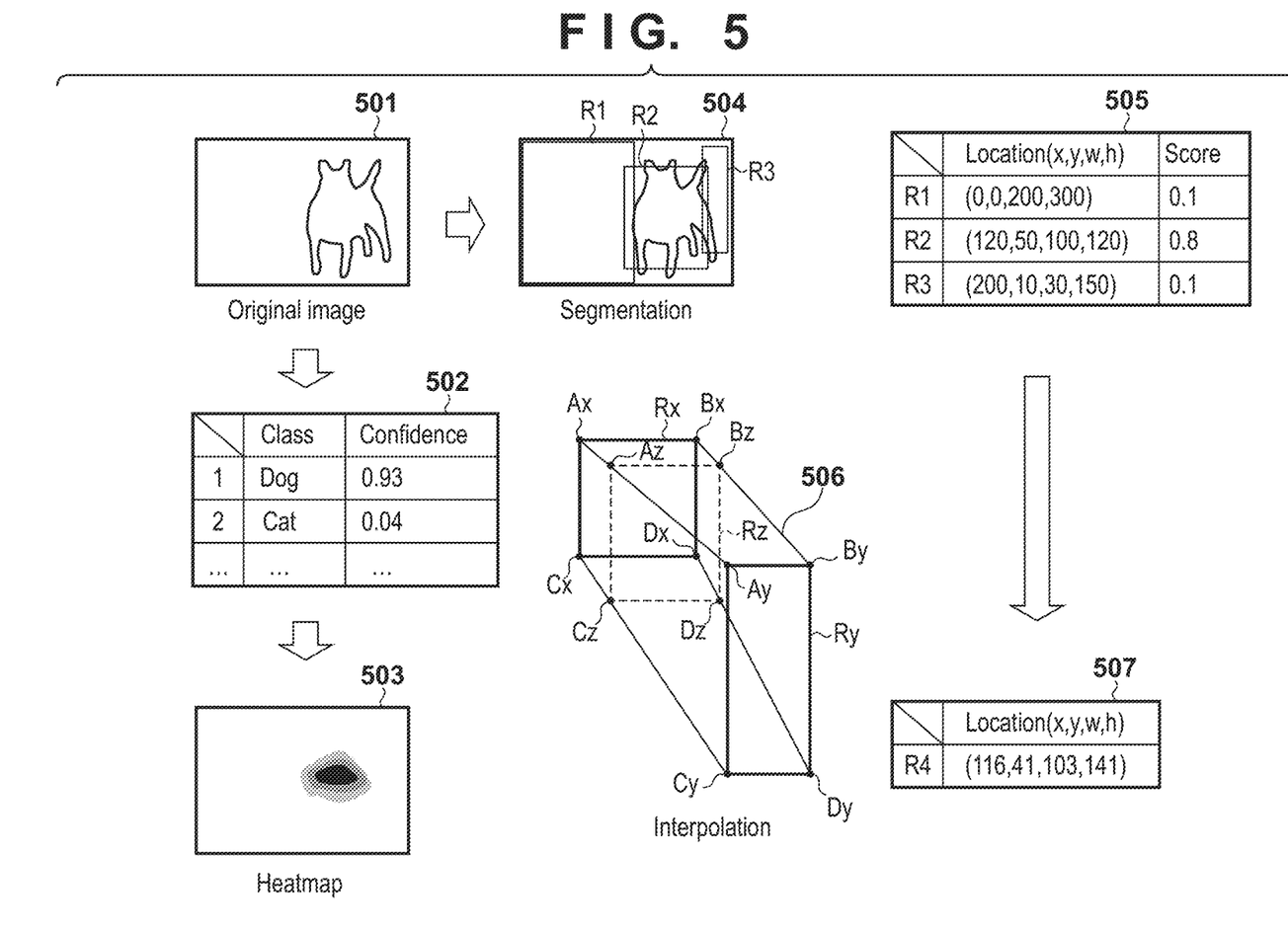
FIG. 5 is a diagram for describing a process of object location estimation.

FIG. 4 is a flowchart illustrating processing for estimating the location of an object in the image processing application 200. The flowchart shown in FIG. 4 is realized, for example, by the CPU 101 reading a program stored in the HDD 105 into the ROM 103 or the RAM 104, then executing the program. Also, FIG. 5 is a diagram for explaining an object location estimation process in the present embodiment. The object location estimation process is described with reference to FIG. 4 and FIG. 5. The process in FIG. 4 starts when the item 312, "estimate location of object," in the menu item 310 illustrated in FIG. 3B is selected. In the case the item 312, "estimate location of object" is selected, a list of folders in the HDD 105 is displayed, and a file to be processed in FIG. 4 may be specified.

Also, the process in FIG. 4 may be executed independently of the user operation. For example, the process illustrated in FIG. 4 may be executed after acquiring image data from the HDD 105 when the image processing application 200 is launched. Alternatively, the process illustrated in FIG. 4 may be executed when the image data is stored on the HDD 105. For example, the process may be executed when image data captured by a camera function of the user terminal 100 is stored on the HDD 105. Alternatively, in the case the image processing application 200 is an album creation application, the process may be executed based on an instruction for generating a layout image.

In step S401, the image acquisition unit 201 acquires image data from the image data storage unit 210. For example, the image acquisition unit 201 acquires, from the image data storage unit 210, image data selected by a user operation from the list of the image specification area 301 on the display screen 300. Here, the step is explained with the assumption that the image data 501 shown in FIG. 5 has been acquired. Image data 501 indicates a "dog" as an example of an object that is a target of image recognition.

In step S402, an image classification unit 202 classifies an object of the image data acquired in step S401 into multiple classes, then outputs a classification result 502 using the learned CNN, which is generated on the cloud server 110 and stored in the learning data storage unit 209. As illustrated in FIG. 5, the classification result 502 is configured to include, for example, one hundred classes and their respective levels of confidence, and is sorted into a descending order from the highest level of confidence. For example, in the classification result 502, an identification number "1" has the highest level of confidence, where the level of confidence for the class "dog" is "0.93". In the present embodiment, a class with the highest level of confidence is what is used to generate a heatmap image, which is described later. The image classification unit 202 stores the classification result 502 in the analysis data storage unit 211.

In step S403, the image generation unit 203 generates a heatmap image 503 based on the classes classified in step S402. The image generation unit 203 generates a heatmap image 503 using, for example, Grad-CAM. The frame of the heatmap image 503 corresponds to the coordinates of the image of the image data 501, and, in the black portions in the frame, the response value is higher the higher the concentration is, and the response value is lower the lower the concentration is (the closer it is to being white). That is, a targeted region in image recognition is indicated in a black color, and the higher the level of interest (the higher the response value) of a region in image recognition, the darker the concentration is shown to be.

In step S404, the region segmentation unit 204 executes region segmentation on image data acquired in step S401. The region segmentation unit 204, based on similarities of pixel values, combines small regions with a high similarity, then groups similar regions by units of pixels of the image. By this, a candidate region of an object is extracted. For example, region segmentation can be executed using a selective search method. Note that a method used for region segmentation is not limited to a selective search as described above, and other methods may be used. The region segmentation unit 204 outputs a segmentation result 504 as a result of region segmentation. The segmentation result 504 corresponds to coordinates in the image of the image data 501. Candidate regions R1 to R3 of the segmentation result 504 represents multiple candidate regions that were extracted by being grouped as similar regions in units of pixels, then, determined as regions, which are object-like. Also, the region segmentation unit 204 outputs location information 505 of candidate regions R1 to R3. The location information 505 of candidate regions R1 to R3 is configured to include information on center coordinates values (x, y), the width (w), and the height (h) of each of the candidate regions R1 to R3 as well as a score, which is described later, that is assigned to each candidate region.

In step S405, the location estimation unit 205 estimates an object location using a heatmap image generated in step S403 and the location information 505 outputted in step S404. In the present embodiment, scores of the location information 505 indicate values obtained by superimposing the candidate regions R1 to R3 on the heatmap image 503, then normalizing the sum of response values within each region. For example, in the location information 505, the candidate region R2 holds a total response value of 0.8. Scores may use other statistics instead of a sum of response values within the region. For example, an average response value per unit region may be used as a score.

In the present embodiment, the location estimation unit 205 acquires an estimated region by interpolating multiple candidate regions R1 to R3. An interpolation method is explained using a conceptual diagram 506 in FIG. 5. The conceptual diagram 506 is a diagram for explaining a method of acquiring an interpolated region Rz by interpolating candidate regions Rx and Ry. In the present embodiment, for example, a region weighted with a score value of each region is calculated using a weighted average, then, that calculated region is assigned as an estimated region. In the case of the conceptual diagram 506, points, which internally divide line segments that connect each of the coordinates in the regions Rx and Ry, are obtained based on a score value of each region, and a region Rz that comprises those points is acquired as an estimated region interpolating from the regions Rx and Ry. For example, coordinate Az, which internally divides a line segment that connects coordinates Ax and Ay, are calculated based on a score value of each of the regions Rx and Ry. Similarly, coordinate Bz, which is an internal dividing point of coordinates Bx and By; coordinate Cz, which is an internal dividing point of coordinates Cx and Cy; and coordinate Dz, which is an internal dividing point of coordinates Dx and Dy, are calculated. Then, the region Rz, which is defined by coordinates Az, Bz, Cz, and Dz, is acquired as an estimated region.

Based on the above, candidate regions R1 to R3 are used to obtain an estimated region R4. The coordinates (x, y), width w, and height h of location information 507 of the estimated region R4 is calculated by the following equations.

$$x = 0 \times 0.1 + 120 \times 0.8 + 200 \times 0.1 = 116$$

$$y = 0 \times 0.1 + 50 \times 0.8 + 10 \times 0.1 = 41$$

$$w = 200 \times 0.1 + 100 \times 0.8 + 30 \times 0.1 = 103$$

$$h = 300 \times 0.1 + 120 \times 0.8 + 150 \times 0.1 = 141$$

The location estimation unit 205 stores, in analysis data storage unit 211, the location information 507 of the estimated region R4 with the image data 501 in association. After step S405, the process in FIG. 4 ends.

As described above, object location is estimated by the present embodiment by using a heatmap image, which is data that indicates a targeted region in an object class determination, and data that indicates object candidate regions extracted based on an image pixel similarity. By this, highly accurate location estimations are made possible. Also, in the present embodiment, multiple candidate regions are extracted, then, these multiple candidate regions are interpolated using a score based on a response value of a heatmap image. By this, a higher accuracy in location estimations is made possible. Additionally, although the process in step S404 in FIG. 4 is explained in the above to be performed after the process in step S403, step S404 may be processed simultaneously with the processing of step S402 and step S403. By such a configuration, the processing efficiency of FIG. 4 can be improved.

Figure 6:
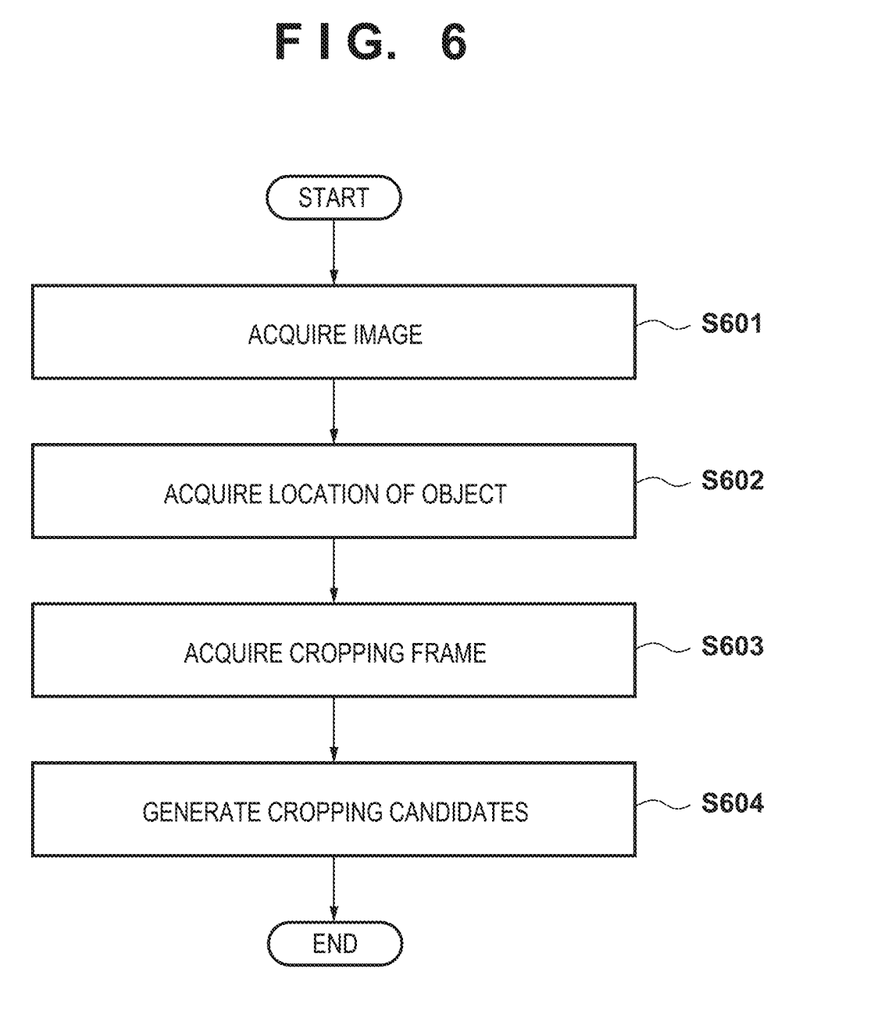
FIG. 6 is a flowchart showing a process of generating a cropped image candidate.

FIG. 6 is a flowchart showing a process of the image processing application 200 for generating a cropped image candidate. The flowchart shown in FIG. 6 is realized, for example, by the CPU 101 reading a program stored in the HDD 105 into the ROM 103 or the RAM 104, then, executing the program. The processing of FIG. 6 starts in response to a user operation such as an image selection operation or a cropping operation on the display screen 300 in FIG. 3A, which is displayed when the item 311 "execute cropping of image" is selected from the menu item 310 shown in FIG. 3B.

In step S601, the image acquisition unit 201 acquires, from the image data storage unit 210, image data selected by a user operation via the image specification area 301.

In step S602, the location acquisition unit 206 acquires, from the analysis data storage unit 211, the location information 507 that corresponds to the image data acquired in step S601. The location information 507 is location information of the estimated region R4 acquired by the location estimation unit 205 in step S405 in FIG. 4.

In step S603, the frame acquisition unit 207 acquires information regarding a cropping frame selected by a user operation via the cropping frame specification box 302. The information regarding a cropping frame, as explained in FIG. 3, is information such as an aspect ratio of a cropped image.

In step S604, the candidate generation unit 208 generates cropped image candidates based on the location information 507 acquired in step S602 and the information regarding a cropping frame acquired in step S603. In the present embodiment, the image processing application 200 generates cropped image candidates corresponding to each of the cropping methods that may be executed.

For example, in FIG. 3, cropped image candidates 304 to 306, which correspond to each of the three types of cropping methods, are generated. The cropped image candidate 304 is a cropped image set so that the location of the acquired estimated region R4 was brought closer to the center of the image, and the cropping frame is maximized at the selected aspect ratio. The cropped image candidate 305 is a cropped image set so that the location of the acquired estimated region R4 was brought closer to the closest point among the four points of intersection created when the image is divided vertically and horizontally respectively into three parts, and the cropping frame is maximized at the selected aspect ratio. The cropped image candidate 306 is a cropped image for which the location of the acquired estimated region R4 was brought closer to the center of the image and then the cropping frame at the selected aspect ratio was magnified to a maximum (for example, 120%). In FIG. 3, the above cropped image candidates 304 to 306 are shown, however, their number shall not be limited to three types as long as it corresponds to the respective cropping methods that the image processing application 200 can execute.

By virtue of the present embodiment as described above, an image processing application that enables an accurate location estimation of an object in image data can be provided. Also, in the present embodiment, intermediate images from a learned CNN are used, and, therefore, learning via a specific object detection algorithm on the user terminal 100 side is not required. Therefore, an implementation of an object location estimation may be simplified in the image processing application. Also, in the present embodiment, cropped images are generated using an estimated region, which enables the generation of accurately cropped images. Thus, the accuracy of object region estimation improves, and this may reduce cases where, for example, a portion of an object is cropped out and is no longer included in the cropped image.

Also, in the present embodiment, a process from launching the image processing application 200 to the generation of cropped image candidates is explained. In the case where, for example, an album creation application is used as the image processing application 200, there may be cases when cropping is performed on image data in laying out an image in order to fit the image into a slot within a template. For example, an image with a 3:4 aspect ratio may be cropped at a 2:3 aspect ratio to lay it out in a slot with a 2:3 aspect ratio. In this case, the frame acquisition unit 207 acquires "2:3" as information regarding a cropping frame in step S603 in FIG. 6. In such a case, multiple cropped image candidates for the acquired 2:3 aspect ratio may be displayed similarly to how cropped image candidates 304 to 306 are displayed to enable the user to select the preferred candidate.

Also, although a class with the highest level of confidence is what is used in generating a heatmap image in step S403 in FIG. 4, limitation is not made to this. Whether classes satisfy a predetermined condition for confidence levels, such as classes with the top five levels of confidence, for example, may be made to be used for generating a heatmap image. Alternatively, multiple classes for which a cumulative confidence level from a class with the highest confidence level is less than or equal to a threshold value may be made to be used for generating a heatmap image. For example, in the case of determining a breed of a dog, in an image, that was made to wear relatively sizeable clothes, a determination result (actual breed A, high confidence level) when targeting just the face, and a determination result (breed B, medium confidence level) from targeting the entire shape with the clothes on may differ. In such a case, accuracy of an estimated region of an object may improve further by assigning multiple determination results (multiple classes), including those mentioned, as a target of heatmap image generation.

Also, in step S404, settings may be provided for the size of a region where region segmentation is executed. For example, region sizes may be changed according to acquired classes. Also, among the regions that were retrieved from region segmentation, regions that are smaller than the predetermined size may be excluded.

Also, in step S405, it was explained that estimated regions are acquired by interpolating multiple candidate regions. However, limitation is not made to this, and, for example, a candidate region with the largest score may be made to be an estimated region. Also, interpolation may be performed on multiple candidate regions whose scores are equal to or higher than a predetermined threshold.

It was explained that, in the present embodiment, the processes in FIG. 4 are executed by the user terminal 100. However, a configuration may be such that a part of the processing in FIG. 4 is executed by the cloud server 110 and the user terminal 100 acquire those execution results. For example, the image classification unit 202 and the image generation unit 203 in FIG. 2 may be configured on the cloud server 110, and the processes in steps S402 and S403 in FIG. 4 may be executed on the cloud server 110. In such a case, the user terminal 100 acquires those execution results (for example, a heatmap image) from the cloud server 110 and executes processes from step S404 onwards. With such a configuration, the configuration of the user terminal 100 may be further simplified.

It was explained that in the present embodiment, object locations estimated by processes from step S401 to step S405 are acquired in step S602 in FIG. 6 as estimated regions. However, limitation is not made to this, and a new estimated region may be acquired using an estimated region acquired from steps S401 to S405 and a result from another image process. For example, a location of a face may be acquired at the same time as a result of performing a facial detection process, and new regions containing all of the multiple objects including a face may be set. For example, an estimated region that encompasses both an estimated object location and a location of the face may be acquired as an estimated region in step S602. Also, one of the multiple objects that include a face may be enabled for selection, and a region that contains the location of the selected object may be acquired as an estimated region.

Also, it was explained that a cropped image candidate is generated using an estimated object location in step S604. A configuration may be taken such that in such a case, for example, if at least either a confidence level or a score is lower than a predetermined value, the estimated object location is not used.

Also, in step S604, a priority ranking may be set up for cropped image candidates. For example, a configuration may be taken so as to identifiably display, at the top, for example, effective cropped image candidates in combination with the background based on image data scene determination results, for example.

Also, it was explained, in the present embodiment, that the learning unit is configured on the cloud server 110 side. However, it may be configured on the user terminal 100 side.

OTHER EMBODIMENTS

Embodiment(s) of the present invention can also be realized by a computer of a system or an apparatus that reads out and executes computer executable instructions (e.g., an one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing method executed by an image processing apparatus, the method comprising steps of:
   acquiring image data;
   acquiring region of interest data for indicating a targeted region in recognition processing for an object included in the image data;
   acquiring information of candidate region based on a degree of being similar to an object included in the image data;
   estimating an object region in the acquired image data based on the region of interest data and the information of a candidate region;
   performing a preview display of a plurality of candidate images to be cropped on a display unit by using information of the estimate object region; and
   receiving a selection by a user from among the plurality of candidate images that are displayed,
   wherein, on the image data, cropping that corresponds to the candidate image, for which the selection was received, is performed, and
   wherein the displayed candidate images are images that the estimated object region is changed based on an aspect ratio specified by the user.

2. The image processing method according to claim 1, wherein the candidate region is extracted by being grouped based on a similarity of a region in the image data.

3. The image processing method according to claim 1, wherein the region of interest data is a heatmap for indicating a targeted region for a determination for classifying an object included in the image data.

4. The image processing method according to claim 1, wherein information on a plurality of candidate regions is acquired,
   and the plurality of candidate regions are each assigned with a score based on the region of interest data.

5. The image processing method according to claim 4, wherein the object region is estimated by interpolating the plurality of candidate regions based on the assigned score.

6. The image processing method according to claim 4, wherein the object region is estimated by weighted averaging of locations of the plurality of candidate regions.

7. The image processing method according to claim 4, wherein a weight acquired based on the region of interest data is used for weighted averaging of locations of the plurality of candidate regions.

8. The image processing method according to claim 1, wherein a neural network is used to recognize the object in the recognition processing,
   and the region of interest data, which is generated based on an intermediate image extracted from an intermediate layer of the neural network, is acquired.

9. The image processing method according to claim 1, wherein information on the estimated object region is stored in association with the image data.

10. The image processing method according to claim 9, further comprising steps of:
    performing image processing for the image data; and
    performing cropping for the image data using the stored information on the object region.

11. An image processing apparatus comprising:
at least one computer coupled to at least one processor that causes the image processing apparatus to function as:
(a) a first acquisition unit configured to acquire image data;
(b) a second acquisition unit configured to acquire region of interest data for indicating a targeted region in recognition processing for an object included in the image data;
(c) a third acquisition unit configured to acquire information of a candidate region based on a degree of being similar to an object included in the image data;
(d) an estimation unit configured to estimate an object region in the image data acquired by the first acquisition unit based on the region of interest data and the information of a candidate region;
(e) a performing unit configured to perform a preview display of a plurality of candidate images to be cropped on a display unit by using information of the estimate object region; and
(f) a receiving unit configured to receive a selection by a user from among the plurality of candidate images that are displayed,
wherein, on the image data, cropping that corresponds to the candidate image, for which the selection was received, is performed, and
wherein the displayed candidate images are images that the estimated object region is changed based on an aspect ratio specified by the user.

* * * * *